Nov. 3, 1953
R. M. LEIPPE
2,658,178
ELECTRICAL WATTHOUR METER
Filed March 6, 1948
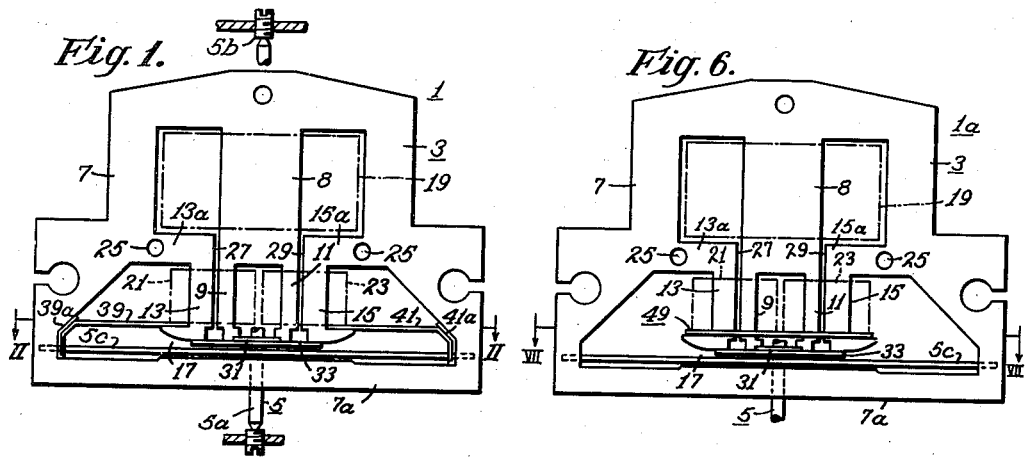
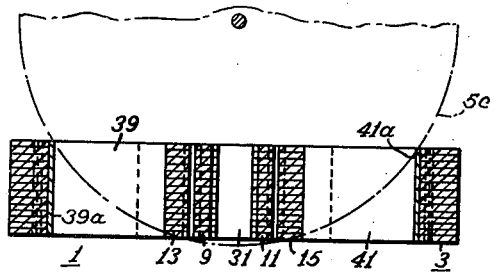
Fig. 2.
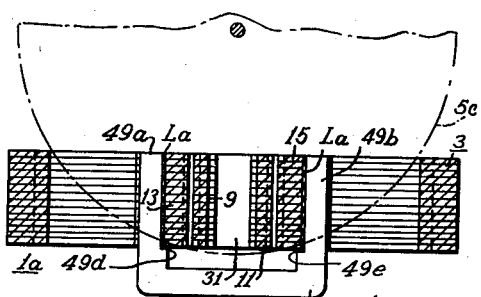
Fig. 7.
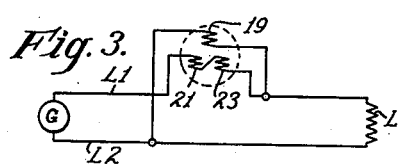
Fig. 3.
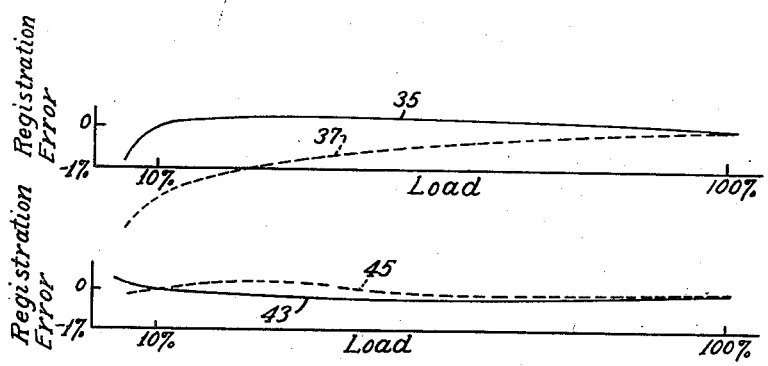
WITNESSES:
Edward Michaels
Wm. C. Groove
INVENTOR
Richard M. Leippe.
BY
C. L. Freedman
ATTORNEY Patented Nov. 3, 1953

2,658,178

UNITED STATES PATENT OFFICE 2,658,178

ELECTRICAL WATTHOUR METER

Richard M. Leippe, Cedar Grove, N. J., assignor to Westinghouse Electric Corporation, East Pittsburgh, Pa., a corporation of Pennsylvania Application March 6, 1948, Serial No. 13,382

17 Claims. (Cl. 324—117)

1

This invention relates to electrical devices which are responsive to variable excitations, and it has particular relation to induction type electrical watthour meters having magnetic shunts associated therewith for the purpose of improving the accuracy of the meters.

An induction type electrical watthour meter has a magnetic structure providing paths for current and voltage magnetic fluxes. Windings associated with the magnetic structure are effective when energized in accordance with the voltage and the current of an alternating current circuit to direct voltage and current magnetic fluxes into an airgap for the purpose of establishing a shifting magnetic field in the airgap. An electroconductive armature is mounted for rotation relative to the magnetic structure and has a portion positioned in the airgap.

The magnetic structure commonly employs magnetic shunts for both voltage and magnetic fluxes. Such shunts divert voltage and current magnetic fluxes away from the airgap and are designed to saturate within the range of energization of the voltage and current windings to improve the accuracy of the meter.

For purposes of illustration, the invention will be described with reference to a meter of the type illustrated and described in the Barnes Patent 2,349,242. As shown in the Barnes patent, the meter has four pole pieces having pole faces positioned in a common plane for supplying current magnetic flux to an airgap. The inner pole pieces also supply voltage magnetic flux to the airgap. A magnetic shunt conventionally is located between the inner pole pieces for the purpose of improving the performance of the meter in the heavy load range.

In accordance with the invention, magnetic shunt means may be associated with a meter to operate in parallel with conventional shunts. The additional shunt means is designed to saturate when the current windings of the meter are energized by current substantially less than rated load current. In the previously mentioned meter, the additional shunt means conveniently may be associated with the outer pole pieces. It has been found that such additional shunt means improves the accuracy of the meter in the light load range not only for unity power factor but for low power factor loads as well. Furthermore, the additional magnetic shunt means may operate in parallel with the conventional voltage magnetic flux shunts to increase the accuracy of the meter over a substantial range of variation of voltage.

2

It is, therefore, an object of the invention to provide an improved watthour meter having a plurality of magnetic shunts operating on different portions of a magnetic flux.

It is a further object of the invention to provide a magnetic shunt operating in parallel with the voltage control section of a meter.

It is a still further object of the invention to provide a watthour meter having a plurality of pairs of current pole pieces and having separate shunt means associated with each of the pairs of pole pieces.

Other objects of the invention will be apparent from the following description taken in conjunction with the accompanying drawing, in which:

Figure 1 is a view in front elevation with parts broken away of a watthour meter embodying the invention;

Fig. 2 is a view in section taken along the line II—II of Fig. 1, with the rotor assembly of the meter shown in broken lines;

Fig. 3 is a schematic view of circuit connections suitable for the watthour meter of Fig. 1;

Fig. 4 is a graphical representation showing the load characteristics of certain prior art meters;

Fig. 5 is a graphical representation showing load characteristics of a meter incorporating the invention;

Fig. 6 is a view in front elevation of a watthour meter incorporating a modified embodiment of the invention; and Fig. 7 is a view in section taken along the line VII—VII of Fig. 6, with the rotor assembly of the meter shown in broken lines.

Referring to the drawing, Figure 1 shows a watthour meter 1 which includes a magnetic structure 3 and a rotor assembly 5. The magnetic structure generally is constructed of a plurality of laminations of soft magnetic iron and has a continuous peripheral or rim portion 7 within which a voltage pole 8 is located. The lower end of the voltage pole 8 is bifurcated to provide two inner pole pieces 9 and 11. In addition, the magnetic structure includes two outer pole pieces 13 and 15. It will be observed that the four pole pieces are disposed in a common plane and that they terminate in pole faces which are located in a common plane spaced above a magnetic member 7a (which comprises a part of the rim portion 7) to provide an airgap 17.

The voltage pole 8 is surrounded by a voltage winding 19, which, when energized, directs voltage magnetic flux in parallel through the inner pole pieces 9 and 11 into the airgap 17. The pole pieces 9 and 13 are surrounded by a current winding 21, which, when energized, directs current magnetic flux through the pole pieces 9 and 13 into the airgap 17. Also, the pole pieces 11 and 15 are surrounded by a current winding 23 which, when energized directs current magnetic flux in parallel through the pole pieces 11 and 15. The current windings 21 and 23 are connected in series and are oppositely poled so that when current magnetic flux is directed downwardly in the pole pieces 9 and 13, it is directed upwardly in the pole pieces 11 and 15.

In order to improve the accuracy of the meter, the outer pole pieces 13 and 15 are connected, respectively, to the rim portion 7 through voltage control sections or shunts 13a and 15a. These sections have openings 25 which cause the control sections 13a and 15a to saturate within the range of energization of the voltage winding 19. It will be understood that when the voltage winding 19 is energized, a portion of the resulting voltage magnetic flux is diverted away from the airgap 17, through the voltage gaps 27 and 29 and the associated control sections 13a and 15a. As the voltage across winding 19 increases, the control sections 13a and 15a saturate to make the response of the meter substantially linear with respect to the voltage applied to the winding 19.

Further improvement in the performance of the meter is provided by a magnetic shunt 31, constructed of magnetically-soft iron or steel, which is positioned between the inner pole pieces 9 and 11. This shunt diverts current magnetic flux away from the airgap 17 and is designed to saturate when the current supplied to the windings 21, 23 has a substantial magnitude, particularly magnitudes in the overload range. By proper design of the shunt 31, it is possible to maintain the accuracy of the meter for currents which may extend to values several times the rated current of the watthour meter.

The light load performance of the meter is adjusted by means of an electroconductive plate 33 which may be adjusted to the right or left, as viewed in Figure 1.

It will be understood that the rotor assembly 5 includes a shaft 5a which is mounted for rotation with respect to the magnetic structure by means of suitable bearings 5b. The shaft 5a supports an electroconductive armature or disc 5c which has a rim portion positioned in the airgap 17. When the windings are energized, the resulting shifting magnetic field produces rotation of the disc 5c in a manner well understood in the art.

The structure of Figure 1 thus far specifically described is well known in the art. Conventional accessories such as a damping magnet (not shown) and a register (not shown) usually would be employed in the meter 1. Fig. 1 may represent one element of a polyphase meter and may be designed for operation at any desired frequency. For the purpose of discussion, it will be assumed that the meter of Figure 1 is a single-phase watthour meter designed for energization from alternating current circuits having a frequency of 60 cycles per second. Typical connections for the meter are represented in Figure 3 wherein the windings 19, 21 and 23 are connected for energization in accordance with the voltage and current of a circuit represented by conductors L1 and L2. In Fig. 3 an alternating current generator G supplies energy to a load L.

When the meter of Figure 1 has only the components that are specifically described above, the performance thereof is similar to that represented by the curves of Figure 4. In Fig. 4, ordinates represent the registration error of the meter and abscissa represent the load being measured by the meter. The full line curve 35 represents the performance of the meter for a unity power factor load. It will be observed that adjustments of the watthour meter are set to provide an accurate registration for 10% of rated load and for 100% of rated load. For values below 10% of rated load, the curve 35 drops appreciably. For values between 10% and 100% rated load, the curve 35 shows that the meter is extremely accurate.

When a load of low power factor is measured by the meter, it is found that the accuracy of the meter drops appreciably. For example, a curve 37 (shown in dotted line) represents the performance of the meter when measuring a load having a low lagging power factor. It will be observed that the accuracy of the meter is substantially lower than that represented by the curve 35, particularly for light loads.

In order to improve the accuracy of the watthour meter, additional shunt means may be provided. Referring again to Figure 1, it will be observed that there are provided two magnetic shunts 39 and 41. The proportions of the shunts depend on the type of material employed and the exact compensation desired. In a specific application of the invention, and expressing dimensions in inches, the shunts were constructed of cold rolled steel having a thickness of .013" and a width of ⅝". These shunts were designed to saturate when the windings 21 and 23 were energized with current substantially below the rated current of the watthour meter. Non-magnetic spacers 39a and 41a separate the rim portion 7 from the adjacent ends of the shunts 39 and 41. For the specific application previously mentioned, the spacers were constructed of brass having a thickness of .005".

The shunts 39 and 41 not only improve the performance of the meter over a substantial range in variation of the current energizing the windings 21 and 23, but they improve the performance of the meter in response to variations in the voltage applied to the winding 19. The improvement apparently results from the fact that the shunts 39 and 41 are in parallel, respectively, with the control sections 13a and 15a, and they tend to saturate over ranges which differ somewhat from the range of voltage for which the sections 13a and 15a saturate.

The effect of the shunts 39 and 41 on the characteristics of the meter 1 may be understood by reference to Fig. 5 which shows curves corresponding to the curves illustrated in Fig. 4. In Fig. 5, a full line curve 43 represents the performance of the meter 1 for a unity power factor load, whereas the dotted curve 45 represents the performance of the meter for a load having a low lagging power factor. The curve 43 represents the characteristics of the meter when the meter is adjusted to provide accurate registrations, at 10% and 100% of rated load. By a comparison of Figs. 4 and 5, it will be seen clearly that the shunts 39 and 41 not only improve the characteristic of the meter for a unity power factor load, but they appreciably improve the performance of the meter for a load of low power factor.

Figs. 6 and 7 show a meter 1a which is similar to the meter 1 of Fig. 1, except for the replacement of the shunts 39 and 41 by a single shunt 49. This shunt 49 is U-shaped (Fig. 7) having two legs 49a and 49b which are connected by a strip 49c. It will be observed that the plane of the shunt 49 is parallel to the armature or disc 5c.

The legs 49a and 49b of the shunt 49 are positioned adjacent the outer pole pieces 13 and tips 13a and 15a which project, respectively, from the pole pieces 13 and 15. The legs 49a and 49b may have steps 49d and 49e which assist in positioning the shunt 49 with respect to the magnetic structure 3.

It will be observed that the shunt 49 establishes a path between the outer pole pieces 13 and 15 which diverts magnetic flux away from the airgap 17. The shunt is proportioned to saturate in the light load range of the watthour meter. It will be observed that the shunt 31 operates on magnetic flux carried by the inner pole pieces 9 and 11, whereas the shunt 49 operates on magnetic flux carried by the outer pole pieces 13 and 15. The characteristics of the meter 1a of Figs. 6 and 7 are represented by the curves 43 and 45 of Fig. 5.

In order to insulate the magnetic shunts magnetically and electrically from the laminations of the magnetic structure, the shunts may be provided with suitable insulation such as an insulating lacquer. This is represented in Fig. 7 by a layer La on each of the legs 49a and 49b.

It will be recalled that the shunts 39, 41 and 49 are designed to saturate when the associated current windings carry current substantially below their rated load currents. The term "saturated" as herein employed carries a connotation of "decremental permeability," "effective decrease in permeability" or "relatively fast reduction in permeability."

I claim as my invention:

1. In an electrical device, a magnetic structure having an airgap, an armature disposed for rotation in the airgap, voltage and current windings effective when energized respectively in accordance with the voltage and current of an electrical circuit for directing voltage and current magnetic fluxes into the airgap to establish a shifting magnetic field therein, said magnetic structure including first shunt means for shunting a substantial part of the voltage magnetic flux away from the airgap, and second shunt means in parallel with the first shunt means, said first and second shunt means being proportioned to saturate over different portions of the range of energization of the voltage winding.

2. A device as claimed in claim 1 wherein each of the shunt means comprises a pair of shunts symmetrically disposed relative to the voltage winding.

3. In an induction watthour meter, a magnetic structure comprising a pair of first spaced pole pieces, a pair of second spaced pole pieces, a magnetic member, said pole pieces having pole faces disposed in a substantially common plane and spaced from the magnetic member to define an airgap, energizable current winding means cooperating with the magnetic structure for establishing, when energized in accordance with the current of an alternating-current circuit, a magnetomotive force between the pairs of pole pieces, a pair of magnetic shunts each extending between a separate one of the first pole pieces and a separate one of the second pole pieces for diverting magnetic flux between the pole pieces, voltage winding means effective when energized from an alternating source of voltage for directing magnetic flux through the magnetic structure into the airgap, said current and voltage winding means when energized producing a shifting magnetic field in the airgap, an electroconductive armature having a portion positioned in the airgrap, and means mounting the armature for rotation relative to the magnetic structure.

4. A device as defined in claim 3 wherein the magnetic shunts are proportioned to saturate over different ranges of energization of the energizable means.

5. In an electrical measuring device, a magnetic structure comprising a magnetic member and four pole pieces positioned substantially in a common plane, said pole pieces being located to provide two outer pole pieces and two inner pole pieces positioned between the outer pole pieces, said pole pieces having pole faces disposed substantially in a common plane spaced from the magnetic member to define an airgap therebetween, voltage winding means cooperating with the magnetic structure for directing, when energized in accordance with the voltage of a circuit, a voltage magnetic flux through the two inner pole pieces in parallel and the airgap, current winding means effective, when energized in accordance with the current of a circuit, for directing current magnetic flux between each of the outer pole pieces and the adjacent one of the inner pole pieces in parallel and the airgap, a first magnetic shunt extending between the inner pole pieces for directing current magnetic flux away from the airgap, and second magnetic shunt means extending from the outer pole pieces for directing magnetic flux away from the airgap, the second magnetic shunt means comprising a U-shaped magnetic shunt having legs adjacent the outer pole pieces.

6. In an electrical measuring device, a magnetic structure comprising a substantially continuous magnetic rim, and two first and two second pole pieces positioned within the rim substantially in a common plane, said four pole pieces having pole faces disposed substantially in a common plane spaced from a portion of the rim to define an air gap between said rim and the pole faces, voltage winding means cooperating with the magnetic structure for directing, when energized in accordance with the voltage of a circuit, a voltage magnetic flux through the first pole pieces in parallel and the airgap, current winding means effective when energized in accordance with the current of a circuit, for directing current magnetic flux between each of the first pole pieces and a separate one of the second pole pieces in parallel and the airgap, a first magnetic shunt extending between the first pole pieces for directing current magnetic flux away from the airgap, and second magnetic shunt means extending from the second pole pieces for directing magnetic flux away from the airgap, the second magnetic shunt means comprising a U-shaped magnetic shunt disposed in a plane parallel to the pole faces, said U-shaped magnetic shunt having a separate leg extending adjacent each of the second pole pieces.

7. In an electrical measuring device, a magnetic structure comprising a magnetic member and four pole pieces positioned substantially in a common plane, said pole pieces being located to provide two outer pole pieces and two inner pole pieces positioned between the outer pole pieces, said pole pieces having pole faces disposed substantially in a common plane spaced from the magnetic member to define an airgap therebetween, voltage winding means cooperating with the magnetic structure for directing, when energized in accordance with the voltage of a circuit, a voltage magnetic flux through the two inner pole pieces in parallel and the airgap, current winding means effective when energized in accordance with the current of a circuit, for directing current magnetic flux between each of the outer pole pieces and the adjacent one of the inner pole pieces in parallel and the airgap, a first magnetic shunt extending between the inner pole pieces for directing current magnetic flux away from the airgap, and second magnetic shunt means extending from the outer pole pieces for directing magnetic flux away from the airgap, said magnetic structure having saturable magnetic control parts for diverting voltage magnetic flux away from the airgap, said control parts being in parallel with the second magnetic shunt means with respect to the voltage magnetic flux, and said second magnetic shunt means being proportioned to saturate in advance of the first magnetic shunt as the current magnetic flux increases.

8. In an electrical measuring device, a magnetic structure comprising a substantially continuous magnetic rim, and two first and two second pole pieces positioned within the rim substantially in a common plane, said four pole pieces having pole faces disposed substantially in a common plane spaced from a portion of the rim to define an airgap between said rim and the pole faces, voltage winding means cooperating with the magnetic structure for directing, when energized in accordance with the voltage of a circuit, a voltage magnetic flux through the first pole pieces in parallel and the airgap, current winding means effective when energized in accordance with the current of a circuit, for directing current magnetic flux between each of the first pole pieces and a separate one of the second pole pieces in parallel and the airgap, a first magnetic shunt extending between the first pole pieces for directing current magnetic flux away from the airgap, and second magnetic shunt means extending from the second pole pieces for directing magnetic flux away from the airgap, the second magnetic shunt means comprising a separate shunt extending between each of the second pole pieces and the rim.

9. In an electrical measuring device, a magnetic structure comprising a substantially continuous magnetic rim, and two first and two second pole pieces positioned within the rim substantially in a common plane, said four pole pieces having pole faces disposed substantially in a common plane spaced from a portion of the rim to define an airgap between said rim and the pole faces, voltage winding means cooperating with the magnetic structure for directing, when energized in accordance with the voltage of a circuit, a voltage magnetic flux through the first pole pieces in parallel and the airgap, current winding means effective when energized in accordance with the current of a circuit, for directing current magnetic flux between each of the first pole pieces and a separate one of the second pole pieces in parallel and the airgap, a first magnetic shunt extending between the first pole pieces for directing current magnetic flux away from the airgap, second magnetic shunt means extending from the second pole pieces for directing magnetic flux away from the airgap, saturable magnetic control structure extending between the rim and said first pole pieces for diverting voltage magnetic flux away from the airgap, said magnetic control structure and the second magnetic shunt means being in parallel with respect to the voltage magnetic flux and designed to saturate at different values of energization of said winding means.

10. In an electrical measuring device, a magnetic structure comprising a substantially continuous magnetic rim, and two first and two second pole pieces positioned within the rim substantially in a common plane, said four pole pieces having pole faces disposed substantially in a common plane spaced from a portion of the rim to define an airgap between said rim and the pole faces, voltage winding means cooperating with the magnetic structure for directing, when energized in accordance with the voltage of a circuit, a voltage magnetic flux through the first pole pieces in parallel and the airgap, current winding means effective when energized in accordance with the current of a circuit, for directing current magnetic flux between each of the first pole pieces and a separate one of the second pole pieces in parallel and the airgap, a first magnetic shunt extending between the first pole pieces for directing current magnetic flux away from the airgap, and second magnetic shunt means extending from the second pole pieces for directing magnetic flux away from the airgap, the second magnetic shunt means including magnetic means saturable within the range of energization thereof and non-magnetic insulating means for introducing non-magnetic spacing and electrical insulation between the magnetic means and the second pole pieces.

11. In an electrical measuring device, a magnetic structure comprising a magnetic member and four pole pieces positioned substantially in a common plane, said pole pieces being located to provide two outer pole pieces and two inner pole pieces positioned between the outer pole pieces, said pole pieces having pole faces disposed substantially in a common plane spaced from the magnetic member to define an airgap therebetween, voltage winding means cooperating with the magnetic structure for directing, when energized in accordance with the voltage of a circuit, a voltage magnetic flux through the two inner pole pieces in parallel and the airgap, current winding means effective, when energized in accordance with the current of a circuit, for directing current magnetic flux between each of the outer pole pieces and the adjacent one of the inner pole pieces in parallel and the airgap, a first magnetic shunt extending between the inner pole pieces for directing current magnetic flux away from the airgap, and second magnetic shunt means extending from the outer pole pieces at a position between the current winding means and the airgap for directing magnetic flux away from the airgap.

12. In an electrical measuring device, a magnetic structure comprising a substantially continuous magnetic rim, and two first and two second pole pieces positioned within the rim substantially in a common plane, said four pole pieces having pole faces disposed substantially in a common plane spaced from a portion of the rim to define an airgap between said rim and the pole faces, voltage winding means cooperating with the magnetic structure for directing, when energized in accordance with the voltage of a circuit, a voltage magnetic flux through the first pole pieces in parallel and the airgap, current winding means effective when energized in accordance with the current of a circuit, for directing current magnetic flux between each of the first pole pieces and a separate one of the second pole pieces in parallel and the airgap, a first magnetic shunt extending between the first pole pieces for directing current magnetic flux away from the airgap, and second magnetic shunt means extending from the second pole pieces at a position between the current winding means and the airgap for directing magnetic flux away from the airgap.

13. In an electrical induction device, a magnetic structure having an airgap and a pair of spaced pole pieces adjacent the airgap, a disc armature in the airgap, means effective when energized for establishing a magnetomotive force between the pole pieces to direct magnetic flux into the airgap, and a saturable magnetic shunt extending between the pole pieces for diverting magnetic flux away from the airgap, the magnetic shunt comprising a U-shaped unitary member disposed in a plane substantially parallel to the armature and spaced from the armature, said pole pieces passing completely between the legs of the U-shaped unitary member and having pole faces extending away from the pole pieces into the space between the U-shaped unitary member and the armature.

14. In an electrical induction device, a magnetic structure having an airgap and a pair of spaced pole pieces adjacent the airgap, a disc armature in the airgap, means effective when energized for establishing a magnetomotive force between the pole pieces to direct magnetic flux into the airgap, and a saturable magnetic shunt extending between the pole pieces for diverting magnetic flux away from the airgap, the magnetic shunt comprising a U-shaped unitary member disposed in a plane substantially parallel to the armature, each of the pole pieces passing completely between the legs of the U-shaped unitary member and having only a single substantially continuous and uninterrupted pole face defining a part of the airgap, each of the pole faces extending into the space between the armature and a separate one of the legs of the U-shaped member, each of said pole pieces abutting the associated pole face substantially over the full cross-section of the pole piece.

15. In an electrical measuring device, a magnetic structure comprising a substantially continuous magnetic rim, and two first and two second pole pieces positioned within the rim substantially in a common plane, said four pole pieces having pole faces disposed substantially in a common plane spaced from a portion of the rim to define an airgap between said rim and the pole faces, voltage winding means cooperating with the magnetic structure for directing, when energized in accordance with the voltage of a circuit, a voltage magnetic flux through the first pole pieces in parallel and the airgap, current winding means effective when energized in accordance with the current of a circuit, for directing current magnetic flux between each of the first pole pieces and a separate one of the second pole pieces in parallel and the airgap, a first magnetic shunt extending between the first pole pieces for directing current magnetic flux away from the airgap, and second magnetic shunt means extending between the second pole pieces for directing magnetic flux away from the airgap.

16. In an electrical measuring device, a magnetic structure comprising a substantially continuous magnetic rim, and two first and two second pole pieces positioned within the rim substantially in a common plane, said four pole pieces having pole faces disposed substantially in a common plane spaced from a portion of the rim to define an airgap between said rim and the pole faces, voltage winding means cooperating with the magnetic structure for directing, when energized in accordance with the voltage of a circuit, a voltage magnetic flux through the first pole pieces in parallel and the airgap, current winding means effective when energized in accordance with the current of a circuit for directing current magnetic flux between each of the first pole pieces and a separate one of the second pole pieces in parallel and the airgap, a first magnetic shunt extending between the first pole pieces for directing current magnetic flux away from the airgap, and second magnetic shunt means extending from the second pole pieces at a position between the current winding means and the airgap for directing magnetic flux away from the airgap, the second magnetic shunt means comprising a separate shunt extending between each of the second pole pieces and the rim.

17. In an electrical measuring device, a magnetic structure comprising a substantially continuous magnetic rim, and two first and two second pole pieces positioned within the rim substantially in a common plane, said four pole pieces having pole faces disposed substantially in a common plane spaced from a portion of the rim to define an airgap between said rim and the pole faces, voltage winding means cooperating with the magnetic structure for directing, when energized in accordance with the voltage of a circuit, a voltage magnetic flux through the first pole pieces in parallel and the airgap, current winding means effective when energized in accordance with the current of a circuit, for directing current magnetic flux between each of the first pole pieces and a separate one of the second pole pieces in parallel and the airgap, a first magnetic shunt extending between the first pole pieces for directing current magnetic flux away from the airgap, and second magnetic shunt means extending from the second pole pieces at a position between the current winding means and the airgap for directing magnetic flux away from the airgap.

RICHARD M. LEIPPE.

References Cited in the file of this patent

UNITED STATES PATENTS

| Number | Name | Date |
|---|---|---|
| 1,299,736 | Knight | Apr. 8, 1919 |
| 1,729,402 | Rutter | Sept. 24, 1929 |
| 1,750,259 | Callsen | Mar. 11, 1930 |
| 1,776,153 | Kinnard | Sept. 16, 1930 |
| 1,826,447 | Beusch | Oct. 6, 1931 |
| 1,856,554 | Harris | May 3, 1932 |
| 2,115,589 | Pratt | Apr. 26, 1938 |
| 2,177,274 | Barnes | Oct. 24, 1939 |
| 2,363,284 | Barnes | Nov. 21, 1944 |